(No Model.)

J. BURKE.
COMPOUNDING MOTOR GENERATORS.

No. 524,376. Patented Aug. 14, 1894.

WITNESSES
A. F. Macdonald
T. J. Johnston.

INVENTOR
James Burke, by
Geo. R. Blodgett,
atty.

UNITED STATES PATENT OFFICE.

JAMES BURKE, OF SCHENECTADY, NEW YORK, ASSIGNOR TO THE GENERAL ELECTRIC COMPANY, OF BOSTON, MASSACHUSETTS.

COMPOUNDING MOTOR-GENERATORS.

SPECIFICATION forming part of Letters Patent No. 524,376, dated August 14, 1894.

Application filed June 5, 1894. Serial No. 513,532. (No model.)

*To all whom it may concern:*

Be it known that I, JAMES BURKE, a subject of the Queen of Great Britain, residing at Schenectady, county of Schenectady, State of New York, have invented certain new and useful Improvements in Compounding Motor-Generators, of which the following is a specification.

My invention relates to a means of compounding motor generators; and has for its object to provide a simple means of so compensating for the changes in load in motor generators as to prevent any serious variation of potential in the secondary current delivered by such machines in action; to which end I arrange an auxiliary and smaller machine by which the compounding is effected. This machine may have its armature mounted on the same shaft or otherwise connected with the other machine, which it is designed to compound and is also connected therewith electrically, as hereinafter pointed out. But it is to be understood that the main machine may be run, if desired, without the compounding machine, and may therefore be a machine of standard pattern, the only changes necessary to fit it for the modified use herein pointed out being changes in the connection of the machine and the line circuits, these changes being made in combination with an auxiliary machine, as presently described.

Figure 1:
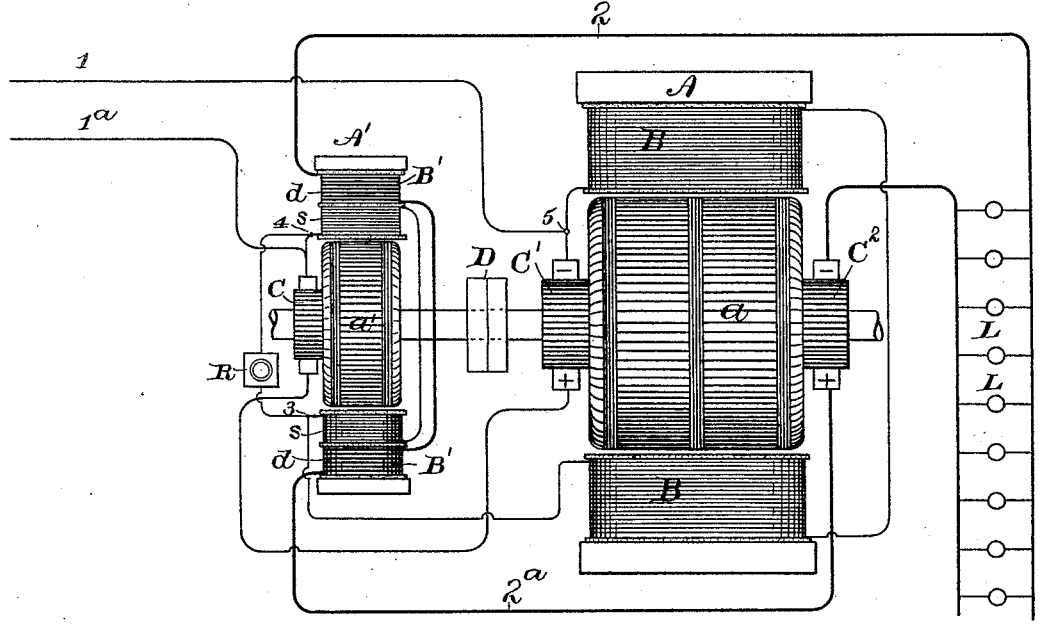
Figure 2:
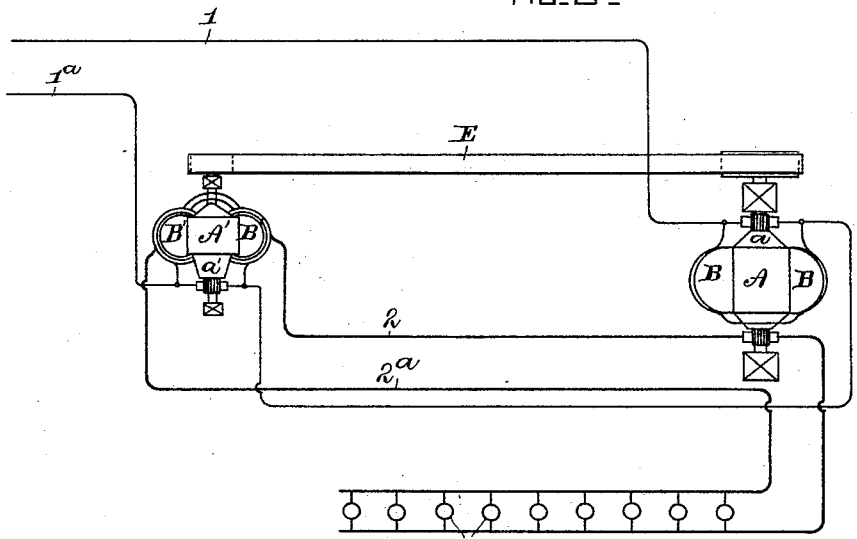

In the accompanying drawings, Figure 1 is a diagrammatic elevation showing my invention with the two armatures arranged upon shafts in the same line and connected by a friction clutch; while Fig. 2 is a diagrammatic plan view showing the same arrangement of circuits and machines, except that the machines are connected by a belt instead of through the shaft.

Referring by letter, A is the larger generator, of which the two commutators $C'$, $C^2$ are connected respectively to the primary lines 1, $1^a$, and the secondary lines 2, $2^a$, the latter leading to the work, represented conventionally by the lamps L, L. The machine thus illustrated has two windings upon its armature, the motor part being driven, as is customary, by the high-tension current, while the generator winding connected to the commutator $C^2$ furnishes the secondary currents. The field-magnets of the main machine are lettered B, B, and its armature $a$.

The auxiliary machine $A'$ having field-magnets $B'$, $B'$ and armature $a'$, is a counter electro-motive force machine, and is provided with a commutator C, shunt windings $s$, $s$, and differential series windings, $d$, $d$. It is connected by the friction clutch represented conventionally at D, to the shaft of the main machine, which, as represented in Fig. 2, may be otherwise connected to the motor generator so as to run in substantial unison with it.

The circuits connecting the two machines are as follows: The primary current enters over the main wire $1^a$ and entering the brush on the commutator C, passes through the armature $a'$, thence to the plus brush of the motor armature $a$, through the armature and thence out through the minus brush to main 1. At point 4 a shunt is taken which passes around field-magnets $s$, thence around field-magnets B, to point 5 where it joins the negative main 1. To vary the strength of the field of the machine $A'$, a resistance R is employed which is connected between points 4 and 3.

The secondary circuit is as follows: Leaving the plus brush upon the commutator $C^2$, the circuit passes around the field-magnets of the auxiliary machine, thence through the work, returning to the minus brush upon the commutator $C^2$; the series coils in this circuit upon the auxiliary field-magnets $B'$, $B'$, are wound differentially to the shunt coils, and the armature $a'$, as already explained, is a motor armature assisting the main motor winding of the rotary transformer A.

Referring to Fig. 2, I illustrate the same combination of machine; the machines are however in this instance separated and are connected by the belt E so as to move together, though they might be belted to a counter shaft or in any other suitable manner connected. The circuits are slightly different, the machine $A'$ having its field-magnets in shunt to its own armature with the series secondary coil also on these field-magnets, while the main generator A has its field-magnets also in shunt to the primary circuit passing through the motor side of its armature, as I consider this arrangement equivalent, though it is not preferred.

The operation of my invention is as follows: Running at normal efficiency, the counter electro-motive force armature is adapted to feed the main current into the main motor winding on the armature of the transformer at the exact potential for which it is adapted, and the transformation is thus effected, delivering secondary current of the desired potential. When however the work increases, and with the work the current required, (and with this current the drop of potential also increases, as is well understood,) this same current passing in the series coils $d, d$, and acting differentially to the shunt coil, tends to demagnetize the field and cut down the counter electro-motive force, so that the current delivered by the primary mains to the main motor armature is of higher potential, and therefore the transformed or secondary current is also raised in potential, so that the machine may be of strict compounding, or may be over-compounded, if desired. This process may go so far as to reverse the polarity of the auxiliary machine, turning it into a generator, and delivering a primary current of a higher electro-motive force than that in the mains. To give an example, suppose that it is intended to transform from a railway circuit of, say, five hundred and fifty volts to a circuit of one hundred and twenty volts adapted for incandescent lightning; the counter electro-motive force armature $a'$ would then have a capacity of fifty volts, delivering current at five hundred volts to the motor part of the armature $a$; as the load came on, this would be cut down until the counter electro-motive force developed would become zero by the balancing action of the differential coils upon the field-magnets of the auxiliary machine, the potential of the primary current in armature $a$ being then five hundred and fifty volts; as the load still further increased, the counter electro-motive force would give place to a direct or assisting electro-motive force, and the potential would rise above the five hundred and fifty volts which the mains 1, 1ª would ordinarily deliver, and be carried up to the safe limit of the machine.

I am aware of the patent to Elihu Thomson, No. 459,423, dated September 15, 1891, in which a machine is illustrated and described capable of effecting some of the objects which my invention attains. In that machine, however, it is necessary to have a specially constructed apparatus embodying all the features of the invention, while in my apparatus, as already pointed out, standard forms of motor generator not provided with compounding features, may be constructed, and by the addition of the auxiliary armature may be converted into compounding machines; in that invention there are also mechanical difficulties attendant upon the peculiar form of armature employed; while by my invention an ordinary motor armature of the desired electro-motive force may be employed, and the only particular care needed is in arranging the compounding effects of the differential windings to adapt the machine to the purposes for which it is intended. I do not wish, therefore, to be understood as making any claim broad enough to interfere with what is set out in the patent referred to; but

What I claim as new, and desire to secure by Letters Patent of the United States, is—

1. As a means of compounding a motor generator under variations of load, an auxiliary source of electro-motive force in the primary circuit, and means adapted to vary the amount of such electro-motive force in response to variations of load in the secondary; whereby the potential of the current delivered from the primary mains to the motor winding upon the armature of the motor-generator is varied according to the load on the machine, and thereby the potential of the secondary current is correspondingly regulated.

2. In combination, a motor-generator having its motor-winding in series in the primary circuit and its field-magnets in shunt to the motor winding, and a second or auxiliary machine having an armature distinct from that of the main machine and in series in the primary circuit and having its field-magnets provided with a winding in shunt to its armature and a second winding in series with the secondary circuit from the generating winding of the main armature; whereby the second or auxiliary machine acts to vary the potential of the primary current delivered to the motor generator in accordance with the secondary current delivered.

3. In combination, a motor-generator having its armature motor-winding in series in the primary circuit and its field-magnets in shunt to the motor winding, and a second or auxiliary counter electro-motive force machine having an armature distinct from that of the main machine, such armature being in series in the primary circuit, and its field-magnets having a winding in shunt to its armature and a differential series winding in the secondary circuit, as set out and described herein.

In witness whereof I have hereunto set my hand this 1st day of June, 1894.

JAMES BURKE.

Witnesses:
B. B. HULL,
A. F. MACDONALD.